Patented Nov. 12, 1935

2,020,674

UNITED STATES PATENT OFFICE 2,020,674

MANUFACTURE OF HYDRATION PRODUCTS OF OLEFINES

Henry Dreyfus, London, England

No Drawing. Application August 25, 1933, Serial No. 686,733. In Great Britain September 13, 1932

7 Claims. (Cl. 260—156)

This invention relates to the manufacture of aliphatic compounds by the hydration of olefines, and especially to the manufacture of ethyl alcohol and diethyl ether by the hydration of ethylene, and is a continuation in part of my applications S. Nos. 640,002 filed 28th October, 1932, and 644,491 filed 26th November, 1932.

In my said applications I have shown that aliphatic alcohols and ethers, and especially ethyl alcohol and diethyl ether, may be formed by the hydration of the corresponding olefines by means of water or water vapor in the presence of salts, especially of an acid character, having a high affinity for water, or of liquid or molten hydration or dehydration catalysts.

I have now found that the hydration of olefines, and of ethylene in particular, may be effected in a highly satisfactory manner by employing as catalysts simple or complex salts of metaphosphoric acid. Thus I may use simple metaphosphates, for example metaphosphates of the alkali or alkaline earth metals, such as sodium metaphosphate, potassium metaphosphate, barium metaphosphate, etc., or mixtures of such compounds. Other simple metaphosphates or mixtures thereof may also be used, such as aluminium metaphosphate and chromic metaphosphate. Di- and poly metaphosphates, referred to generically in the accompanying claims as complex meta-phosphates, may also advantageously be employed, for instance magnesium dimetaphosphate, sodium di-, tri-, or hexametaphosphate, etc., while the invention also includes the use of catalyst masses comprising complex metaphosphates containing a plurality of metals, for instance potassium barium dimetaphosphate, sodium barium trimetaphosphate, sodium calcium tri- or hexa-metaphosphate, sodium magnesium octo-metaphosphate, etc.

The reaction may be performed at temperatures upwards of about 100° C., and especially at temperatures between about 150° and 350° C. Elevated pressures are very useful for accelerating the reaction, for example pressures of about 20 to 50 atmospheres or more.

In applying the invention I preferably pass mixtures of ethylene and steam over, through or otherwise in contact with the catalysts under the desired conditions of temperature and pressure. For instance, such mixtures may be passed under the desired temperature and pressure conditions, through tubes or the like containing the catalysts or containing the catalysts supported upon or in association with filling materials or carriers, e. g., pumice, kieselguhr or carborundum.

The proportions of olefine and water vapor to be employed will depend largely on the nature of the desired product. Thus, if a product containing a large proportion of the corresponding ether is required, it is preferable to employ mixtures containing at least two volumes of olefine to each volume of water vapor. If on the other hand an alcohol is to be the main product, mixtures containing a higher proportion of water vapor may be employed. Preferably, however, large excess of water vapor is avoided, as such excess tends to produce a dilute alcohol, or to render the recovery of a concentrated alcohol a matter of difficulty.

The invention is not restricted to the hydration of ethylene but may be applied, irrespective of the method in which it is carried into effect, to the hydration of olefines in general. Thus, for instance the invention may be applied to the production of isopropyl alcohol from propylene or to the hydration of higher homologues of propylene, such, for instance, as butylene. If desired, mixtures of olefines, whether or not containing ethylene, may be subjected to the process of the invention.

The following example illustrates the invention, which is in no way limited thereby.

Example

A mixture comprising approximately equal quantities of ethylene and water vapor is led under a pressure of 50 atmospheres through a tube capable of withstanding high pressure, containing sodium trimetaphosphate deposited on pumice, the tube being heated to a temperature of about 300° C. The chief product of the reaction is ethyl alcohol, which may be separated from the ethylene and water remaining and from any diethyl ether formed in any convenient way.

What I claim and desire to secure by Letters Patent is:—

1. The manufacture of hydration products of olefines comprising reacting an olefine with water vapor at an elevated temperature in the presence of a metaphosphate of a metal.

2. The manufacture of hydration products of olefines comprising reacting an olefine with water vapor at an elevated temperature in the presence of a solid catalyst mass comprising as the essential constituent a metaphosphate of a metal.

3. The manufacture of a hydration product of ethylene comprising reacting ethylene with water vapor at an elevated temperature in the presence of a solid catalyst mass comprising as the essential constituent a metaphosphate of a metal.

4. The manufacture of hydration products of olefines comprising reacting an olefine with water vapor at an elevated temperature in the presence of a complex metaphosphate of a metal.

5. The manufacture of hydration products of olefines comprising reacting an olefine with water vapor at a temperature between 150° and 350° C. under a pressure higher than atmospheric in the presence of a metaphosphate of a metal.

6. The manufacture of hydration products of ethylene comprising reacting ethylene with water vapor at a temperature between 150° and 350° C. under a pressure higher than atmospheric in the presence of a metaphosphate of a metal.

7. The manufacture of hydration products of ethylene comprising reacting ethylene with water vapor at a temperature between 150° and 350° C. under a pressure higher than atmospheric in the presence of a complex metaphosphate of a metal.

HENRY DREYFUS.